United States Patent [19]

Cuscurida et al.

[11] Patent Number: 4,612,335

[45] Date of Patent: Sep. 16, 1986

[54] POLYOXYALKYLENE POLYETHER AMINO ALCOHOLS CONTAINING A TERTIARY HYDROXYL GROUP AND FLEXIBLE POLYURETHANES MADE THEREFROM

[75] Inventors: Michael Cuscurida; Howard P. Klein, both of Austin, Tex.

[73] Assignee: Texaco, Inc., White Plains, N.Y.

[21] Appl. No.: 731,195

[22] Filed: May 6, 1985

[51] Int. Cl.⁴ ............................................. C08G 18/14
[52] U.S. Cl. .................................... 521/167; 564/477; 564/480
[58] Field of Search ................. 521/167; 564/477, 480

[56]  References Cited

U.S. PATENT DOCUMENTS

| 3,872,116 | 3/1975 | Gipson | 564/477 |
| 4,471,138 | 9/1984 | Stogryn | 564/477 |
| 4,495,369 | 1/1985 | Werner et al. | 564/480 |

*Primary Examiner*—Maurice J. Welsh

*Attorney, Agent, or Firm*—Jack H. Park; Kenneth R. Priem

[57]  ABSTRACT

Polyoxyalkylene polyether amino alcohols are prepared which have the following formula:

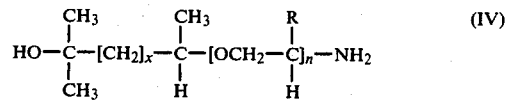

wherein, R represents hydrogen or a methyl or an ethyl group, x represents a number having an average value of about 1 to about 4 and n represents a number having an average value of about 1 to about 40.

The polyoxyalkylene polyether amino alcohol is prepared by alkoxylating a glycol that contains one tertiary hydroxyl group and also a primary or secondary hydroxyl group in order to form an alkoxylated intermediate and by then reductively aminating the alkoxylated intermediate.

10 Claims, No Drawings

POLYOXYALKYLENE POLYETHER AMINO ALCOHOLS CONTAINING A TERTIARY HYDROXYL GROUP AND FLEXIBLE POLYURETHANES MADE THEREFROM

BACKGROUND OF THE INVENTION

1. Field of the Invention

This invention relates generally to polyoxyalkylene polyether amino alcohols containing a tertiary hydroxyl group, their preparation, and their use as chain extenders in the preparation of flexible polyurethane elastomers and flexible polyurethane foam. The amino alcohols of the present invention, which may also be characterized as alpha, tertiary hydroxypolyoxyalkylene polyether-omega-amines are prepared from a polyalkylene glycol containing a tertiary hydroxyl group and a secondary hydroxyl group which is alkoxylated with ethylene oxide, propylene oxide or butylene oxide or a mixture thereof to form a polyether intermediate which is then reductively aminated to provide the desired amino alcohol. The thus prepared materials are useful as chain extenders in the preparation of flexible polyurethanes, such as flexible polyurethane elastomers and flexible polyurethane foams, coatings, adhesives, sealants, etc.

2. Prior Art

Prescott et al. U.S. Pat. No. 3,179,606 is directed to cellular polyurethane foam made from a polyoxyalkylene polyether polyol and a polyethylene polyamine.

Edwards et al. U.S. Pat. No. 3,297,597 is directed to Mannich condensates of a phenol, formaldehyde and an alkanolamine and to their use in the manufacture of polyurethanes.

Lee et al. U.S. Pat. No. 3,236,895 discloses diamines prepared from polyoxypropylene glycol starting materials.

Yeakey U.S. Pat. No. 3,654,370 is directed to polyoxyalkylene polyamines prepared from the corresponding polyoxyalkylene polyols.

Moss et al. U.S. Pat. No. 3,838,076 is directed to polyurethane foams prepared from partially aminated polyoxyalkylene polyether polyols wherein the amine groups are introduced by reductive amination of the polyoxyalkylene resin in the presence of a hydrogenation-dehydrogenation catalyst, hydrogen and ammonia.

Cuscurida et al. U.S. Pat. No. 4,296,213 is directed to polyurea polymer polyols made by reacting a hydroxyl-containing amine, a polyether polyol and an organic polyisocyanate. The hydroxy-containing amine is an alkanolamine or a heterocyclic compound such as hydroxyethyl piperazine, etc. The use of 2-hydroxyethylethylenediamine is disclosed as a suitable hydroxyl-containing amine.

U.K. Patent Application No. 2,072,204A is directed to modified polyols prepared by polymerizing an amino alcohol such as an alkanolamine with a polyisocyanate in the presence of a polyether polyol. Amine starting materials that are mentioned include compounds such as the ethanolamines, methyl diethanolamine, the isopropanolamines, etc. It is stated that it is possible to use secondary or tertiary alkanol amines which are halogen substituted at the alkyl group.

SUMMARY OF THE INVENTION

The present invention is directed to polyoxyalkylene polyether amino alcohols having the following formula:

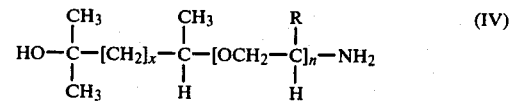

wherein, R represents hydrogen or a methyl or an ethyl group, x represents a number having an average value of about 1 to about 4 and n represents a number having an average value of about 1 to about 40.

The polyoxyalkylene polyether amino alcohols of the present invention are prepared by the reductive amination of an alkylene oxide adduct of a glycol containing either a secondary or a primary hydroxyl group and a tertiary hydroxyl group. The polyoxyalkylene polyether amino alcohols of the present invention are useful as chain extenders in the manufacture of flexible polyurethanes such as flexible polyurethane elastomers and flexible polyurethane foam.

DETAILED DESCRIPTION

The Polyoxyalkylene Polyether Amino Alcohol

The starting materials for the preparation of the polyoxyalkylene polyether amino alcohols of the present invention are a glycol and an epoxide.

The glycol to be used is a glycol that contains one tertiary hydroxyl group. The other hydroxyl group may be primary or secondary, as illustrated by the following formula:

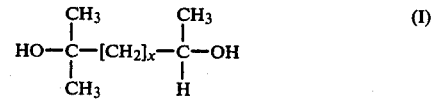

wherein, x has a value of about 1 to about 4. Representative glycols that may be used include, for example, 2-methyl-2,4-pentane diol (commonly known as hexylene glycol), 2-ethyl-2,4-hexanediol, 2-methyl-2,5-hexanediol, 2-ethyl-4-methyl-3,5-heptanediol, etc.

The epoxide starting material to be used is suitably ethylene oxide, propylene oxide or butylene oxide or a mixture thereof. Such epoxides have the formula:

wherein, R represents hydrogen, a methyl group or an ethyl group.

The glycol feedstock is alkoxylated with the epoxide under basic alkoxylation conditions. Thus, the glycol may be reacted in a suitable reaction vessel, such as a jacketed kettle containing temperature control means and an agitator together with appropriate feed lines and a draw off line. The glycol is reacted with from about 1 to about 40 moles of the alkylene oxide to form a polyoxyalkylene polyether glycol intermediate. The reaction is suitably conducted at a temperature of about 80° to about 150° C. under a modestly elevated pressure. Examples of alkaline materials that may be used in the reaction include sodium hydroxide, potassium hydroxide and the corresponding hydrides and alkoxides.

The polyoxyalkylene polyether intermediate characteristically will have the following formula:

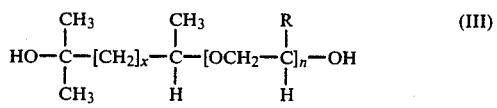

wherein, R has the meaning given above and wherein x represents a number having an average value of about 1 to about 4, and n has a value of 1 to 40.

The thus prepared polyoxyalkylene polyether intermediate is then reductively aminated in the presence of hydrogen and ammonia using a nickel, copper, chromia catalyst of the type disclosed by Yeakey U.S. Pat. No. 3,654,370. Such catalysts are described, for example, in U.S. Pat. No. 3,152,998. The catalyst is prepared by the reduction of a mixture of the oxides of nickel, copper and chromium in the presence of hydrogen at a temperature within the range of about 250° to 400° C. Calculated on an oxide-free basis, the catalyst contains about 60-85 mole percent nickel, 14-37 mole percent copper and 1-5 mole percent chromium. A particularly preferred catalyst composition is one containing 70-80 mole percent nickel, 20-25 mole percent copper and 1-5 mole percent chromium.

The process is conducted at a temperature within the range of from about 150° to 275° C. with a preferred range being from 200° to 250° C. The pressure may be varied from 500-5000 psig with the preferred range being 2000-4000 psig. The process may be conducted with or without a solvent. Solvents that may be employed include water and inert hydrocarbons such as heptane and cyclohexane. A preferred solvent is liquid ammonia which can be present in a 10-40 mole excess with a 20-30 mole excess being preferred. It is convenient to use ammonia as a solvent since ammonia is necessary to the reaction.

The process may be conducted batchwise, as is done with prior art processes using Raney nickel catalyst, or it may be conducted continuously. Continuous operation is preferred, since, in general, batch processes are slow and require filtration to remove the catalyst.

The resultant reductive amination product will be comprised primarily of a polyoxyalkylene polyether amino alcohol having the following formula:

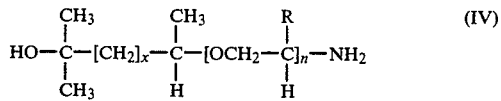

wherein, x, R and n have the meanings given above.

Manufacture of Flexible Polyurethanes

The components utilized for the manufacture of a flexible polyurethane include the polyoxyalkylene polyether amino alcohol of the present invention, a polyol, an organic polyisocyanate, a catalyst, and other desired additives such as fire retardants, dyes, fillers, etc.

The polyol component in the present invention comprises a polyoxypropyloxyethylene polyether polyol having a hydroxyl number between 20 and 60 and a functionality of 2 to 8.

Normally, propylene oxide will constitute from about 80 to about 100 wt. % of the total polyol composition. Up to about 20 wt. % of ethylene oxide may be utilized if desired, based on the weight of the propylene oxide.

A wide variety of initiators may be alkoxylated to form useful polyoxypropylene polyols. Thus, for example, polyfunctional amines and alcohols of the following types may be alkoxylated: monoethanolamine, diethanolamine, triethanolamine, ethylene glycol, polyethylene glycols, propylene glycols, polypropylene glycols, glycerine, trimethylolpropane, pentaerythritol, sorbitol, sucrose, and mixtures thereof.

Such above amines or alcohols may be reacted with an alkylene oxide component consisting of 100 to about 80 wt. % of propylene oxide and 0 to about 20 wt. % of ethylene oxide using techniques known to those skilled in the art. Thus, for example, the reaction of alkylene oxides with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol will determine the amount of alkylene oxide used to react with the initiator. The polyoxypropylene polyether polyol may be prepared by reacting the initiator with propylene oxide or by reacting the initiator first with propylene oxide followed by ethylene oxide or vice versa in one or more sequences to give a so-called block polymer chain or by reacting the initiator with a mixture of propylene oxide and ethylene oxide to achieve a random distribution of such alkylene oxides. As noted above, the polyoxypropylene polyether polyols useful here have a hydroxyl number ranging from about 20 to about 60. The reaction mixture is then neutralized and water and excess reactants are stripped from the polyol.

Typical aromatic polyisocyanates that may be used in the practice of the present invention include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Methylene-bridged polyphenyl polyisocyanate mixtures which have a functionality of from about 2 to about 4 may also be used. These latter isocyanate compounds are generally produced by the phosgenation of corresponding methylene bridged polyphenyl polyamines, which are conventionally produced by the reaction of formaldehyde with a primary aromatic amine, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The methylene-bridged polyphenyl polyisocyanate mixtures used here may contain from about 20 to about 100 wt. % of methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. The isocyanate mixtures are known materials.

The catalysts which may be used to make the foams are well known. Tertiary amines and organo-metallic compounds are normally preferred. They are used in effective amounts.

Examples of suitable tertiary amines, used either individually or in admixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, diethylpiperazine, N-ethylmorpholine, dimethylaniline, nicotine, dimethylaminoethanol, tetramethylpropanediamine, and methyltriethylenediamine.

Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc.

Selection of the individual catalysts and the effective amounts to use in the polyurethane reaction are well within the knowledge of those skilled in the art, and an amine and organo-metallic compound are often used together in the polyurethane reaction.

Another conventional ingredient that is usually employed is a so-called foam stabilizer. The foam stabilizers are frequently used even when the desired product is a urethane elastomer in order to minimize the formation of large void spaces in the elastomer. Foam stabilizers are also known as silicone oils or emulsifiers. The foam stabilizer may be an organic silane or siloxane. For example, compounds may be used having the formula:

$$RSi[O-(R\ SiO)_n\text{-(oxyalkylene)}_mR]_3 \qquad (V)$$

wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl)phosphate, tris(2,3-dibromopropyl)phosphate, 2,2-bis(chloromethyl)-1,3 propylene bis[-di(2-chloroethyl)phosphate], tris(2-chloroethyl)phosphate, tris(2-chloropropyl)phosphate, bis(dichloropropyl)tribromopentyl phosphate, tetrakis-(2-chloroethyl)ethylene diphosphate (sold by Olin Chemicals as THERMOLIN ®101), FYROL ® EFF (oligomeric chloroalkyl phosphate, sold by Stauffer Chemical Co.), tricresyl phosphate, cresyl diphenyl phosphate, chlorinated paraffins, and brominated paraffins. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range of from about 10 to about 50 parts by weight per 100 parts by weight of polyol in the reaction mixture. It is preferred to use from about 10 to about 20 parts by weight.

The polyurethane foams are preferably made in one step by reacting all the ingredients together (the one-shot process). Alternately, the so-called "prepolymer" method may be used wherein only a portion of the polyol is initially reacted with the polyisocyanate to form a so-called prepolymer having an excess of free, or unreacted isocyanate groups. The rest of the polyol and other ingredients may then be added to the prepolymer to complete the reaction.

When it is desired to form a flexible polyurethane foam, an effective amount of a so-called blowing agent should also be employed.

Water is normally the preferred blowing agent for flexible foam. All or part of the water may be replaced with an inert blowing agent such as trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents including low-boiling hydrocarbons such as butane, pentane, hexane, cyclohexane, and the like. See U.S. Pat. No. 3,072,582, for example.

In accordance with the present invention from about 0.5 to about 5 wt. % of the polyol component is replaced with the chain extender polyoxyalkylene polyether amino alcohol of the present invention. Since the chain extender contains a primary or secondary amine group, it is self-catalyzing. Moreover, the amine group will react rapidly with the other ingredients in the formulation.

An advantage of the present invention is that the terminal tertiary hydroxyl group is significantly less reactive than the amine group and therefore reacts only slowly with the other components of the formulation. As a consequence, the chain extender of the present invention is more uniformly incorporated into the polyurethane resulting in a product having improved tensile strength properties. When the polyurethane product is a flexible polyurethane foam, flexibility will not be impaired but at the same time a firmer foam will be formed.

SPECIFIC EXAMPLES

EXAMPLE 1

This example will illustrate the preparation of the hexylene glycol-based diol. This diol served as the starting material for the amino alcohols of this invention.

Hexylene glycol* (4.0 lb) and 72 g 45% aqueous potassium hydroxide were charged into a five-gallon kettle. Maintaining a nitrogen purge the mixture was heated to 100° C. and stripped to a water content of 0.032 wt. %. Propylene oxide (9.6 lb) was then reacted at 105°–115° C. at 50 psig. Approximately 2.5 hours was required for addition of the propylene oxide. The reaction mixture was then digested 2.5 hours to an equilibrium pressure. The alkaline product was then neutralized by stirring two hours at 95° C. with 300 g magnesium silicate which was added as an aqueous slurry.

Di-t-butyl p-cresol (13.2 g) and Hyflo Supercel (50 g) were also added at this time. The neutralized product was vacuum stripped to a minimum pressure, nitrogen stripped, and filtered. The finished product had the following properties:

*2-methyl-2,4-pentanediol; Ashland Chemical Co.

TABLE I

| Sample No. 5748-32 | |
|---|---|
| Properties | |
| Acid no., mg KOH/g | 0.003 |
| Hydroxyl no., mg KOH/g | 163 |
| Water, wt. % | 0.02 |
| pH in 10:6 isopropanol-water | 7.8 |
| Color, Pt—Co | 25 |
| Sodium, ppm | 0.5 |
| Potassium, ppm | 1.4 |

The NMR spectra of the product indicated that the propylene oxide addition had taken place at the secondary hydroxyl with less than 10% addition taking place at the tertiary carbon.

EXAMPLE 2

This example will illustrate the reductive amination of the hexylene glycol-initiated diol of this invention. The diol of Example 1 was reductively aminated at 210° C. in a one-liter continuous reactor over a copper, chromium, nickel catalyst (Ni 2717). Reaction conditions were as follows:

TABLE II

| Polyol space velocity, g/ml/hr | 0.28 |
|---|---|
| Polyol feed rate, lb/hr | 0.75 |
| Ammonia feed rate, lb/hr | 0.60 |
| Hydrogen feed rate, l/hr | 50 |

The amino alcohol had the following properties:

TABLE III

| Sample No. 5663-83 | |
|---|---|
| Properties | |
| Total acetylatables, meq/g | 2.96 |
| Total amine, meq/g | 2.77 |
| Primary amine, meq/g | 2.72 |
| Water, wt. % | 0.04 |
| Color, Pt—Co | 25-30 |
| pH | 12.2 |
| Peroxide, ppm | 0.25 |
| Viscosity, °F., cs | |
| 77 | 46 |
| 100 | 14 |

The data show the tertiary hydroxyl group to be unreactive in the total acetylatable test. The NMR spectra showed that no amination had occurred on the tertiary alcohol group.

EXAMPLE 3

This example will illustrate the attempted reductive amination of hexylene glycol. It further shows the necessity of alkoxylating these type materials before they can be reductively aminated.

The hexylene glycol was reductively aminated at 200°–230° C. in a 1200 ml continuous reactor over a nickel, copper, chromium catalyst (Ni 2717). Reaction conditions were as follows:

TABLE IV

| Polyol space velocity, g/ml/hr | 1.36 |
|---|---|
| Polyol feed rate, lb/hr | 1.5 |
| Ammonia feed rate, lb/hr | 2.2 |

TABLE IV-continued

| Hydrogen feed rate, l/hr | 25 |
|---|---|

An analysis of the product showed that little, if any of the desired reaction had taken place.

EXAMPLE 4

This example will show the use of the aminopolyols of this invention in the preparation of flexible urethane foam. It will further show that higher levels of the products of this invention can be incorporated into the formulation as compared to a 400 molecular weight polyoxypropylenediamine. (JEFFAMINE D-400; Texaco Chemical Co.) This reflects the reduced reactivity of the amino alcohols of this invention. It further shows that the tertiary hydroxyl of the amino alcohols does react with the isocyanate group.

Formulations, details of reaction, and results are shown in the following table:

TABLE V

| Foam No. | 5895-48B | 5895-48C | 5895-48D | 5895-48E |
|---|---|---|---|---|
| Formulation, pbw | | | | |
| THANOL F-3016[a] | 100 | 100 | 100 | 100 |
| Amino alcohol of Example 1 | 2 | — | 5 | — |
| Polyoxypropylenediamine[b] (400 m.w.) | — | 2 | — | 5 |
| Water | 4.0 | 4.0 | 4.0 | 4.0 |
| L-711 Silicone[c] | 1.0 | 1.0 | 1.0 | 1.0 |
| THANCAT TD-33[d] | 0.3 | 0.3 | 0.3 | 0.3 |
| 50% stannous octoate in dioctyl phthalate[e] | 0.5 | 0.5 | 0.5 | 0.5 |
| Toluene diisocyanate | 50.2 | 50.6 | 50.9 | 52.0 |
| Isocyanate index | 1.05 | 1.05 | 1.05 | 1.05 |
| Details | | | | |
| Cream time, sec. | 11 | 10 | 9 | 9 |
| Rise time, sec. | 82 | 82 | 80 | 75 |
| Density, pcf | 1.46 | 1.43 | 1.41 | — |
| Appearance | Good open foam | Good slightly tight | Good slightly tight | Shrunk badly, discarded |

[a]3000 m.w. propylene oxide/ethylene oxide adduct of glycerin; Texaco Chemical Co.
[b]JEFFAMINE D-400; Texaco Chemical Co.
[c]A product of Union Carbide Chemical Co.
[d]33% triethylenediamine in propylene glycol; Texaco Chemical Co.
[e]Catalyst T-10; M & T Chemicals It will be noted from Table V that examples 5895-48B and 5895-48D demonstrate the improved results obtainable with the present invention. Thus, when the use of the amino alcohol of Example 1 is compared with a 400 molecular weight polyoxypropylene diamine, it is observed that at an equivalent weight level, a better quality foam is obtained with the product of the present invention. This demonstrates that higher than normal amounts of the chain extender of the present invention may be used with good results in the manufacture of polyurethane foam in accordance with the present invention.

Having thus described our invention, what is claimed is:

1. A method for preparing a polyoxyalkylene polyether amino alcohol containing a tertiary hydroxyl group which comprises the steps of:
 (a) alkoxylating a glycol feedstock under basic alkoxylation conditions with an epoxide to provide a polyoxyalkylene polyether glycol intermediate, and
 (b) reductively aminating said polyoxyalkylene polyether glycol under reductive amination conditions in the presence of a nickel, copper, chromia reductive amination catalyst, ammonia and hydrogen to thereby provide said polyoxyalkylene polyether amino alcohol containing said tertiary hydroxyl group, (c) said glycol feedstock having the formula:

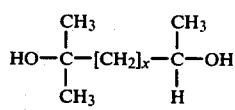   I (d) said epoxide having the formula:

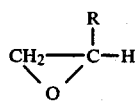   II (e) said polyoxyalkylene polyether intermediate having the formula:

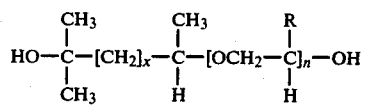   III (f) said polyoxyalkylene polyether amino alcohol having the formula:

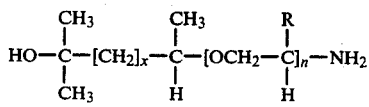   IV (g) wherein, in said formulae, R represents hydrogen or a methyl or an ethyl group, x represents a number having an average value of about 1 to about 4 and n represents a number having an average value of about 1 to about 40.

2. A method as in claim 1 wherein R is methyl, x has a value of about 1 and n has a value of about 6.

3. In a method for preparing a flexible polyurethane wherein a polyoxypropylene polyether polyol is reacted with an excess of an organic polyisocyanate in the presence of effective amounts of a catalyst, the improvement which comprises:

replacing from about 0.5 to about 5 wt. % of said polyol with a chain extender having the formula:

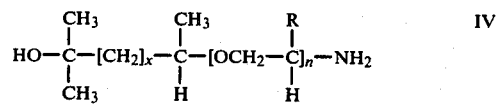   IV wherein R represents hydrogen or a methyl or an ethyl group, x is a number having an average value between about 1 and 4 and n represents a number having an average value between about 1 and about 40.

4. A method as in claim 3 wherein R is methyl, x has a value of about 1 and n has a value of about 6.

5. A method as in claim 3 wherein effective amounts of a blowing agent and a foam stabilizer are included in the formulation to thereby provide a flexible polyurethane foam.

6. A method as in claim 5 wherein R is methyl, x has a value of about 1 and n has a value of about 6.

7. In a flexible polyurethane foam prepared by reacting a polyoxypropylene polyether polyol with an excess of an organic polyisocyanate in the presence of effective amounts of a catalyst, the improvement which comprises a flexible foam wherein (a) the polyoxypolypropylene polyether polyol is a polyoxypropylene polyether polyol having a hydroxyl number between about 20 and 60, a functionality of from about 2 to 8, a molecular weight within the range of about 2,000 to about 8,000 and having been prepared by reacting an initiator having a functionality of about 2 to about 8 with an alkylene oxide component consisting essentially of from about 100 to about 80 wt. % of propylene oxide and, correspondingly, from about 20 to about 0 wt. % of ethylene oxide, and (b) from about 0.5 to about 5 wt. % of said polyoxypropylene polyether polyol is replaced with a chain extender having the formula:

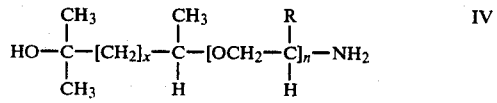   IV wherein R represents hydrogen or a methyl or an ethyl group, x is a number having an average value between about 1 and 4 and n represents a number having an average value between about 1 and about 40.

8. A polyurethane as in claim 7 wherein R is methyl, x has a value of 1 and n has a value of about 6.

9. A polyurethane as in claim 7 wherein the formulation also includes effective amounts of a blowing agent and a foam stabilizer to thereby provide a flexible polyurethane foam.

10. A polyurethane foam as in claim 9 wherein R is methyl, x has a value of 1 and n has a value of about 6.

* * * * *